Jan. 12, 1932.  W. H. WELCH  1,840,684
METAL CUTTING MACHINE
Filed July 28, 1925   5 Sheets-Sheet 1

Fig.1

Inventor
William H. Welch
By Frederick S. Church
his Attorney

Jan. 12, 1932.  W. H. WELCH  1,840,684
METAL CUTTING MACHINE
Filed July 28, 1925  5 Sheets-Sheet 3

*Fig. 3*

Inventor
William H. Welch
By Frederick S. Church
his Attorney

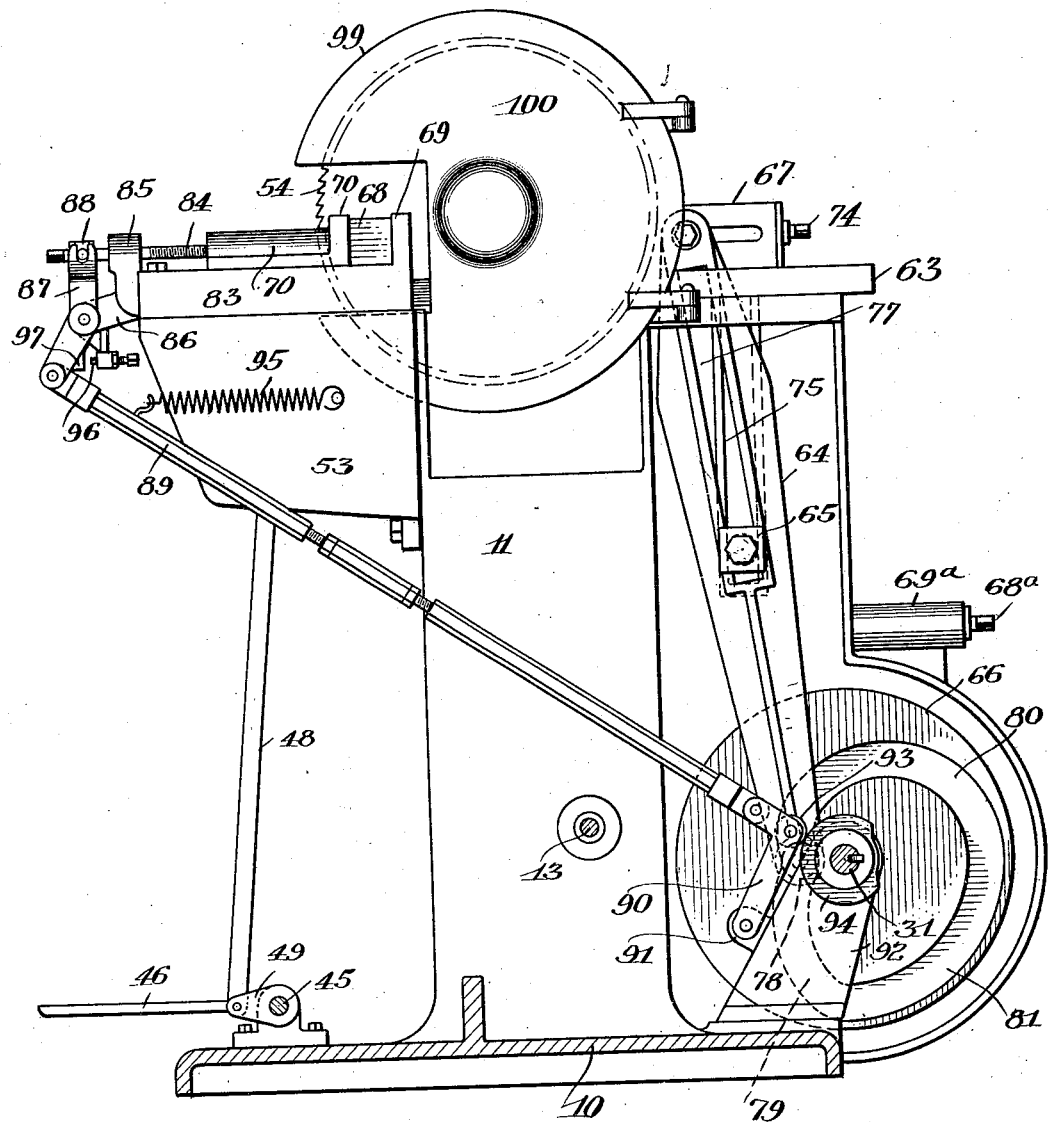

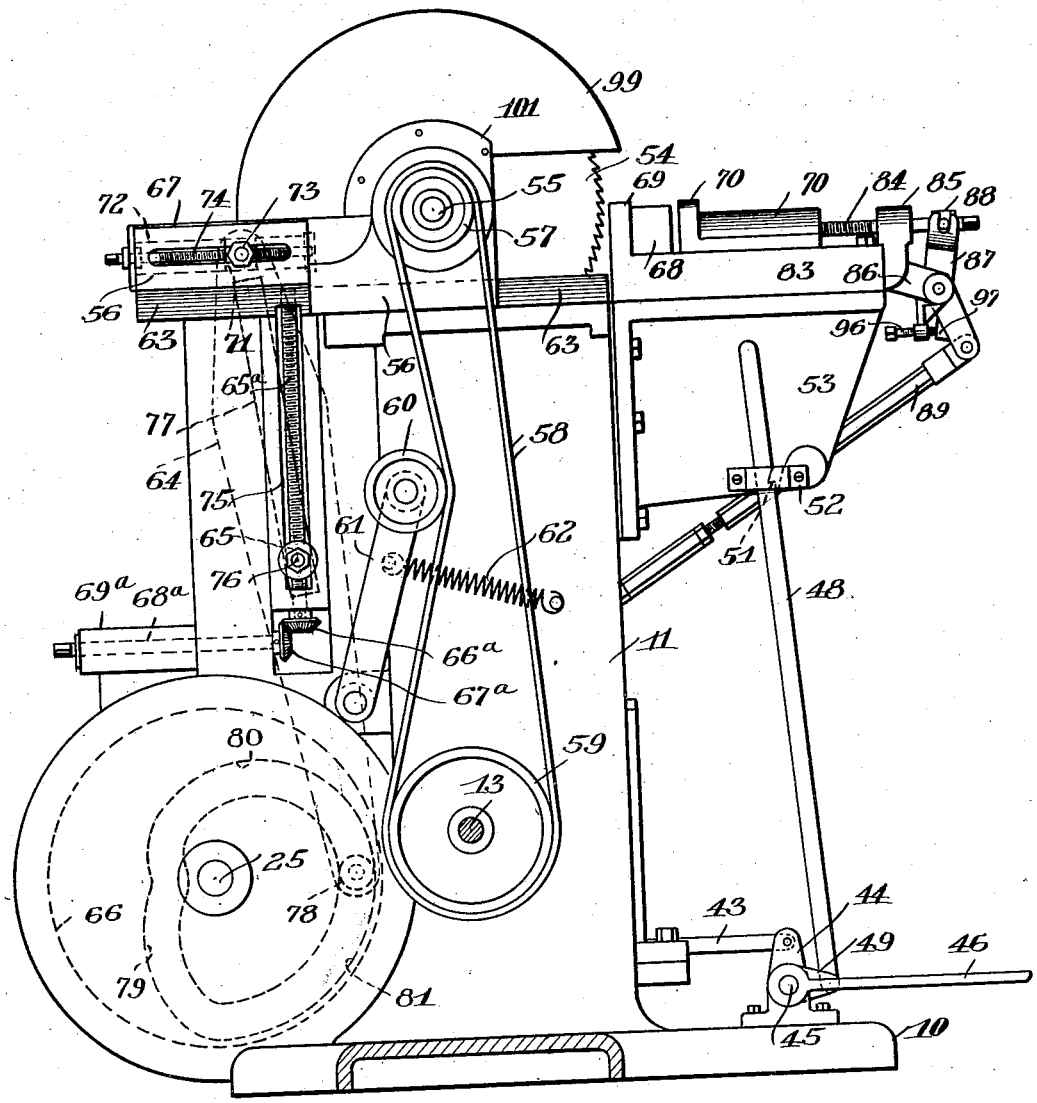

Patented Jan. 12, 1932

1,840,684

UNITED STATES PATENT OFFICE

WILLIAM H. WELCH, OF ROCHESTER, NEW YORK, ASSIGNOR TO COCHRANE-BLY COMPANY, OF ROCHESTER, NEW YORK, A CORPORATION OF NEW YORK

METAL CUTTING MACHINE

Application filed July 28, 1925. Serial No. 46,633.

The present invention relates to metal cutting machines, and has for its object to provide an improved machine of this type in which a revoluble cutter, such as a saw, may be reciprocated to and from the work at different speeds whereby the cutter will more effectively accommodate itself to the different classes of work upon which it is adapted to operate from time to time.

A further object of the invention is to provide a machine of the class described embodying a power driven cutter mounted upon a carriage with improved means for reciprocating and varying the stroke and speed of the carriage.

Another object of the invention is to provide an improved metal cutting machine embodying a power driven saw or cutter with means for moving the saw to and from the work in combination with work holding or gripping means timed to grip the work upon approach of the saw thereto.

A still further object of the invention is to provide a metal cutting machine embodying a reciprocably mounted saw or cutter together with work gripping and release means and improved operating mechanisms therefor timed or coordinated to function in proper sequence so that the work will be automatically gripped upon approach of the cutter thereto and released when severed, the number of reciprocations per minute, both for the cutter and work gripping means, being variable but remaining constant regardless of the number of cutting operations for any given period of time.

A further object is to provide an improved machine of the class described which is simple in construction, efficient in operation and comparatively economical to manufacture.

To these and other ends the invention resides in certain improvements and combinations of parts, all as will be hereinafter more fully described, the novel features being pointed out in the claims at the end of the specification.

In the drawings:—

Figure 1 is a front elevation of a machine illustrating one embodiment of the invention;

Figure 3 is a side elevation of the same showing the saw at inoperative position;

Figure 4 is a somewhat similar view, partly in section, showing the saw advanced through the work, and Figure 5 is a side elevation showing the opposite side of the machine from that indicated in Figure 3.

Similar reference numerals throughout the several views indicate the same parts.

Figure 2:
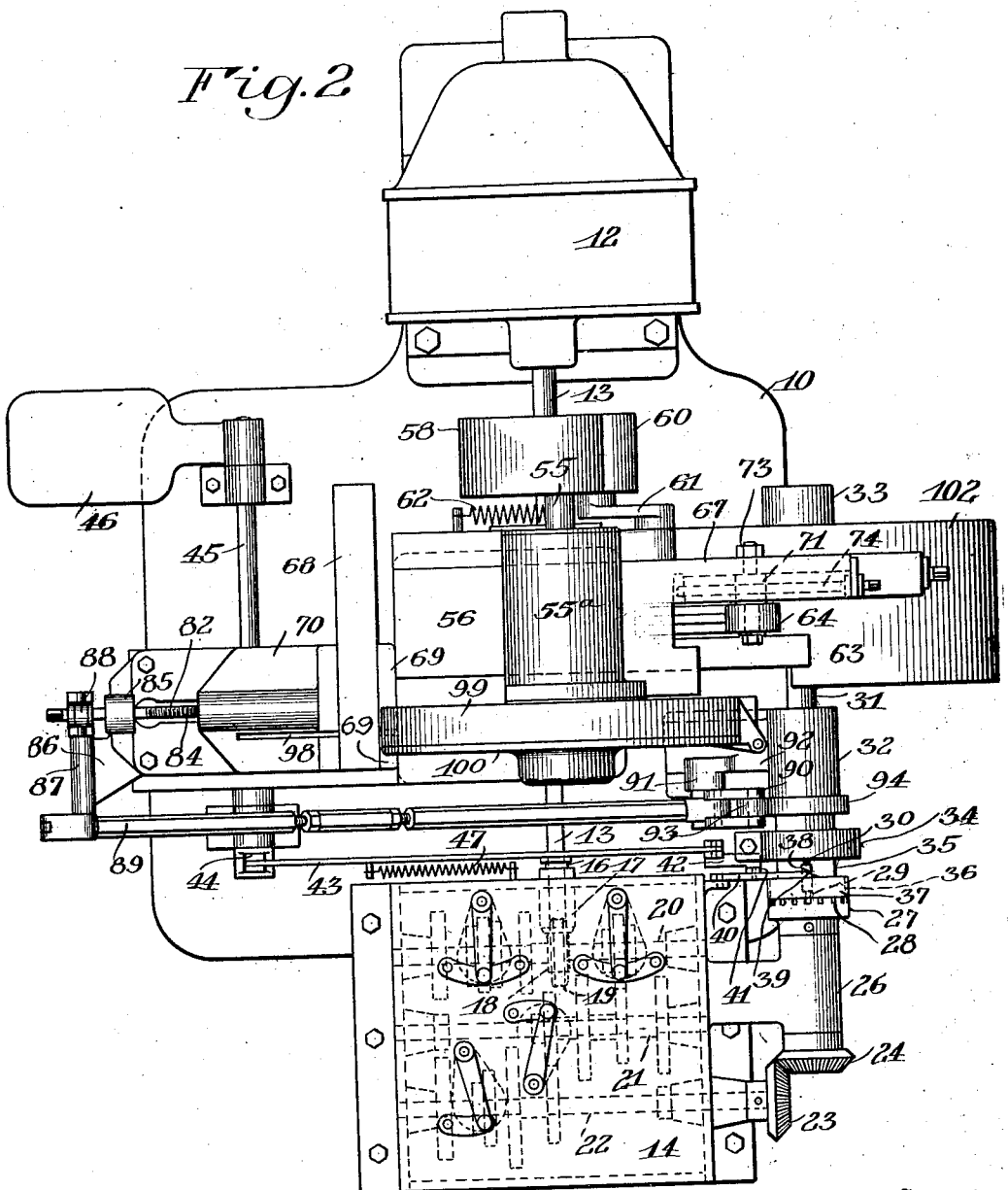
Figure 2 is a top plan view of the machine shown in Figure 1.

The present invention while embodying a metal cutting machine of the revolving saw or cutter type is one which may be used in connection with different classes of work or kinds of material where it is desired to sever predetermined lengths, as from steel bars, tubing, wire and other materials as desired.

The machine illustrated herein embodies briefly a power driven reciprocably mounted saw and work holder with a variable or change speed mechanism designed, in the present instance, preferably to afford from one to thirty reciprocations per minute of the saw and work holder, with the operating mechanisms therefor coordinated or timed to work in unison so as to maintain the proper relationship between the movements of the saw carriage and the movable part of the work gripping means.

Referring to the drawings, 10 represents a base carrying an upstanding frame 11 on one side of which is mounted a power unit, such as a motor 12 having a drive-shaft 13 journaled in the frame and projected therethrough. On the opposite side of the frame is provided a variable speed mechanism illustrated somewhat diagrammatically by dotted lines in Figure 2 and being enclosed in a casing 14 supported by a bracket or extension 15 of the base 10 as shown in Figure 1. The motor shaft 13 is suitably connected with a coupling 16 journaled in a bearing 17 rigid with the casing 14 and having a worm 18 meshing with a worm wheel 19 on a transverse shaft 20 disposed within the casing. The shaft 20 is adapted to drive additional shafts 21 and 22 through the use of a series of sliding and relatively fixed gears as shown by dotted lines in Figure 2, the gear ratios being such as to give the results desired, such a mechanism being well known in the art and requiring no further description. The shaft 22 is provided with a gear 23 meshing with a gear 24 on a short shaft 25 journaled in a suitable bearing 26. The shaft 25 has fixed thereon a clutch member 27 preferably including a series of radial grooves 28 for receiving a clutch pin 29 actuated by a spring 30 into operative position when not disconnected by means which will be hereinafter described.

A cam shaft 31 is journaled in bearings 32 and 33 on the frame 11 and is provided with a suitable brake adapted to quickly stop the machine upon disconnecting the clutch, such as a band brake disposed in the present instance within a housing 34 secured upon the frame, the band being suitably tensioned to constantly afford the desired pressure upon said shaft. The cam shaft 31, at a point adjacent the brake housing 34, is provided with an extension 35 terminating in an enlarged disk shaped portion 36 having formed in its periphery a slot, not shown, in which is slidably mounted the clutch pin 29, the latter being held within the slot by a band 37 suitably secured upon the disk. The clutch pin is provided with a beveled shoulder 38 adapted, when it is desired to disengage the clutch, to be moved to release position by the beveled end 39 of a pivoted release member 40. The release member is operated by a link 41 actuated by a bell crank 42 having an operating rod 43 connected with an arm 44 on a horizontal shaft 45. The shaft 45 is provided with a pedal 46 through the depression of which the operator may readily start the machine by moving the clutch pin controlling member 40 to release position. Upon release of the pedal a spring 47 serves to actuate the rod 43 to return the clutch pin control member to normal position at which it holds the clutch pin disengaged from the grooves 28. If it is desired to have the machine run continuously, the clutch pin release member may be locked at inoperative position or out of the path of the shouldered portion 38 of the clutch pin. This can be done through the use of an upstanding latch rod 48 connected with an arm 49 of the shaft 45 and having a notch 50 adapted to receive a tooth or projection 51 on a bracket 52 carried by a lateral extension 53 of the frame 11 as shown in Figure 5.

The saw or cutter 54 is carried by a spindle 55 journaled in a suitable bearing 55a on a carriage 56, said spindle having a pulley 57 for receiving a belt 58 driven by a lower pulley 59 on the motor shaft 13 as shown in Figure 5. The belt is properly tensioned by an idler 60 on a pivoted arm 61, the idler being yieldably held in engagement with the belt by a spring 62.

The carriage is adapted to be reciprocated upon ways 63 at the top of the frame 11 by a lever 64 pivoted on a fulcrum block 65 and arranged to be operated by a cam 66 on the shaft 31 in a manner explained hereinafter. The upper end of the lever is adjustably connected with an arm or extended portion 67 of the carriage to afford adjustment of the latter whereby to permit different size saws to be used or the adjustment of any one thereof relative to the work, which may vary in size or shape from time to time, being indicated in the present instance at 68 as a rectangular bar adapted to be held during the cutting operation by a vise or work holder embodying a pair of stationary jaws or members 69 and a reciprocably mounted clamping member 70, also having a pair of jaws on the opposite sides of the saw receiving slot 98 formed in the slide, said jaws being clearly shown in Fig. 2 in engagement with the work 68.

A block 71, with which the upper end of the lever is pivotally connected, is in the form of a slide mounted in a slot or guideway 72 formed in the extended portion 67 of the carriage. The block is adapted to be clamped in the desired position of adjustment by a nut 73 on a threaded extension of the block and upon loosening the nut the block may be adjusted by means of a feed screw 74 threaded therethrough and supported in a suitable manner as shown in Figure 5.

The lever fulcrum block 65 is adjustably disposed in a guideway 75 formed in a portion of the frame 11 and is clamped in any desired position of adjustment by a nut and washer on a threaded extension 76 of the block. The block at its opposite side is provided with an extension forming a pivotal support for the lever and being provided preferably with a loosely mounted bearing member, not shown, fitted within the slotted portion 77 of the lever to permit free vertical movement of the latter whereby to compensate for the movement of the saw holding carriage which travels in a straight line under all conditions of operation. Adjustment of the block 65 is preferably effected by a feed screw 65a threaded therethrough and having a beveled pinion 66a meshing with a similar pinion 67a on a shaft 68a journaled in a bearing 69a and adapted to be turned by a suitable tool, such as a wrench.

The cam 66 for actuating the lever is preferably of the grooved type, the lever being provided with a roller 78 adapted to travel within the groove as will be well understood. The advancing, retracting and dwell portions of the cam groove are indicated respectively at 79, 80 and 81 in Figures 3 and 4. The portion 79 is adapted to afford a gradual or relatively slow advance of the saw carriage while the portion 80 is adapted to rapidly withdraw the same from the work. The dwell portion 81 affords ample time for the opening and closing of the work holding vise whereby to permit the operator to feed and adjust the work therein, which is preferably fed into engagement with a stop not shown.

The reciprocably mounted slide 70 of the vise is provided with a downwardly extending portion, not shown, which is movable in a slotted portion 82 of a bracket 83 bolted to the frame extension 53 whereby said slide is properly guided in its movement to and from work gripping position. The slide 70 is provided with an adjustable operating extension 84 threaded therein which is guided by a lug 85 on the bracket 83 as shown in Figure 3, and by which the distance between the work gripping members may be varied to accommodate different size work pieces. The bracket 83 is provided with an arm 86 upon which is pivoted a lever 87, one arm of which extends upwardly and is forked to receive the trunnions of a block 88 on the adjustable rod 84. The lever 87 is pivotally connected with an operating rod or pitman 89, the lower end of which is pivotally disposed between the jaws of a forked lever 90 pivotally supported upon a lug 91 on an upstanding bracket 92 carried by the base 10 and adapted to support the cam shaft bearing 32. Within the forked end of the lever 90 is disposed a roller 93 adapted to bear upon a cam 94 rigid on the cam shaft 31. A spring 95 is connected with the pitman 89 and is adapted to urge the roller against the cam and to move the work gripping member or slide 70 to release position subsequent to each cutting operation. The cam 94 for controlling the movements of the slide 70 is so constructed as to permit the slide to be moved into and out of engagement with the work during the time the roller 78 of the lever 64 is traversing the dwell portion 81 of the carriage operating cam 66.

An adjustable stop 96, preferably in the form of a screw, is provided for varying the extent of the opening between the jaws 69 and those of the slide 70, according to the size of the work pieces to be operated upon from time to time. The screw extends in the path of a downwardly projecting lug 97 on the lever 87 and when the roller 93 reaches the low point of the cam 94 the spring 95 moves the pitman 89 to the right, as viewed in Figure 3, until the lug engages the screw to limit the outward movement of the jaw 70. Different types and sizes of saws or revoluble cutters may be used, depending on the size of the work and the class of materials to be cut.

A suitable guard 99 is provided for the saw, preferably including a hinged closure 100, the guard and closure being cut-away at a point opposite the work holder to afford sufficient clearance for the work when the carriage is in its extreme forward position. The guard is supported by an upstanding plate 101 on the cylindrical bearing 55a of the saw spindle. A guard 102 is also provided for the carriage operating cam 66 as shown in Figures 2 and 3.

I claim as my invention:

1. In a metal cutting machine, the combination of a frame, a carriage mounted to slide thereon, a cutter revolubly mounted upon the carriage, a lever for reciprocating the carriage arranged to effect movement thereof in a straight path, a cam for operating the lever adapted to impart a uniform and relatively slow movement to the carriage during its forward stroke and a relatively rapid movement during its return stroke, with a dwell between the return and forward strokes, means for driving the cutter and cam and an automatic work gripping device including a movable part actuated by said driving means.

2. In a metal cutting machine, the combination of a frame, a carriage mounted to slide thereon, a cutter revolubly mounted upon the carriage, a member adapted to reciprocate the carriage, a cam operatively connected with said member and having a dwell, a vise adapted to hold the work during the cutting operation, means adapted to open and close the vise during the dwell and means for driving the cam and cutter.

3. In a metal cutting machine, the combination of a frame, a carriage mounted to slide thereon, a cutter revolubly mounted upon the carriage, a cam provided with a dwell, means operatively connecting the cam with the carriage to effect reciprocation of the latter, driving means for the cam including a clutch, manually operable means adapted upon release to effect disengagement of the clutch, and means for locking the disengaging means in position to permit the machine to run continuously.

4. In a metal cutting machine, the combination of a frame, a carriage mounted to slide thereon, a cutter revolubly mounted upon the carriage, means for driving the cutter, a lever operatively connected with the carriage for reciprocating the same, a cam shaft having a cam for actuating the lever and imparting a uniform and relatively slow movement to the carriage during its forward stroke and a relatively rapid movement during its return stroke, a work gripping device including a reciprocably mounted member and a cam on said shaft operatively connected with said member.

5. In a metal cutting machine, the combination of a frame, a carriage mounted to slide thereon, a cutter revolubly mounted upon the carriage, a lever operatively connected with the carriage for reciprocating the same, a cam shaft having a cam operatively connected with the lever for imparting a uniform and relatively slow movement to the carriage during its forward stroke and a relatively rapid movement during its return stroke, a work gripping device including a reciprocably mounted member, operating mechanism for said member, a cam for actuating said mechanism adapted to be driven by said shaft, and means for driving said cutter and said shaft.

6. In a metal cutting machine, a frame, a carriage thereon, a saw mounted for rotation upon the carriage, an upstanding lever upon the frame, means adjustably connecting one end of the lever with the carriage, an operating device for the lever at the opposite end thereof, an adjustable fulcrum for the lever disposed intermediate its ends, driving means for the saw and said operating device and a gripping device for the work including a reciprocably mounted part operatively connected with a portion of said driving means.

7. In a metal cutting machine, a frame, a carriage thereon, a saw mounted for rotation upon the carriage, an upstanding lever, means adjustably connecting one end of the lever directly with the carriage to permit it to be adjusted toward and from the axis of the saw, a fulcrum for the lever adjustable longitudinally thereof, a cam operatively connected with the lever and arranged to effect a relatively slow movement of the carriage in one direction and a relatively quick movement in the opposite direction, driving means for the cam and saw and a gripping device for holding the work in position to be operated upon by the saw, arranged to be actuated by said driving means.

8. In a metal cutting machine, a frame, a carriage thereon, a saw mounted for rotation upon the carriage, an upstanding lever, means adjustably connecting one end of the lever with the carriage to permit it to be adjusted toward and from the axis of the saw, a fulcrum for the lever adjustable longitudinally thereof, a cam operatively connected with the lever to effect reciprocation of the carriage, a work gripping device including a reciprocably mounted member, an operating device for said member and common actuating means for the cam and said operating device.

9. In a metal cutting machine, a frame, a carriage mounted to slide thereon, an actuating member for the carriage, a spindle rotatable upon the carriage, a saw carried by the spindle, a cam operatively connected with the actuating member and having a dwell cooperating with the actuating member to provide a period of rest for said carriage, a vise for holding the work including a reciprocably mounted section slotted to receive the saw and arranged to engage the work on opposite sides of the saw blade during the cutting operation, means including a cam for operating said section during the dwell of the first mentioned cam and driving means for the cams.

10. In a metal cutting machine, the combination of a frame, a carriage mounted to slide thereon, a saw rotatably mounted upon the carriage, a lever for sliding the carriage having one end operatively connected therewith, rotary cam means for operating the lever to effect reciprocation of the carriage, a fulcrum for the lever located intermediate its ends and on which the lever is arranged to slide during operation of the cam means, and common driving means for said saw and cam means.

11. In a metal cutting machine, a frame, a carriage mounted to slide upon the frame, a saw rotatable upon the carriage, a pair of fixed jaws on the frame between which the saw is movable when advanced by the carriage to severing position with respect to a work piece, a slide on the frame having spaced jaws movable with the slide to engage the work piece at opposite sides of the plane of the saw to clamp the work piece in engagement with said fixed jaws, the jaws of the slide permitting the saw to move therebetween upon completion of the severing operation, a lever pivotally connected with the carriage for reciprocating the same, a cam operatively connected with the lever, a second cam operatively connected with the slide, and driving means for said cams.

WILLIAM H. WELCH.